Patented May 6, 1930

1,757,089

UNITED STATES PATENT OFFICE

SAMUEL P. HOWE, OF PINE VALLEY, CLEMENTON, NEW JERSEY

CLUTCH-FACING MATERIAL AND PROCESS FOR ITS PRODUCTION

No Drawing. Application filed December 12, 1928, Serial No. 325,669. Renewed March 20, 1930.

The object of this invention is to produce a suitable material for facing the contact disks of clutches. These clutches are especially adapted for use in automobiles. This facing material is intended to give longer life, better wearing qualities and a smoother and more efficient clutch action.

To obtain the foregoing desirable results my invention consists in using the combination of a woven asbestos fibre and a mineral lubricant which is a compound composed of ground and sifted mica as a base.

The facing material in its finished form consists of a fabric of woven asbestos fibres having small wires of brass or other suitable material passing therethrough. This fabric is formed by the following process.

The mineral lubricant compound consisting of ground and sifted mica is introduced in powdered form into finely shredded asbestos fibres. These fibres are then rubbed together to make threads. These threads are then taken and spun with a core of thin wire of brass or similar suitable metal. Two or more of these threads, thus produced, are twisted together to form a cord. From these cords the fabric, which is intended for use as a clutch facing, is woven. This fabric is cut into the shape desired and fastened to a metallic clutch disk by rivets or in any other suitable manner.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A clutch facing which consists of a fabric containing mica and asbestos fibre.

2. A clutch facing which consists of a fabric containing a mineral lubricant of ground and sifted mica and asbestos fibres.

3. A clutch facing which consists of a fabric containing mica, asbestos fibres and wires of suitable metal.

4. A clutch facing which comprises a fabric containing a mineral lubricant of ground and sifted mica, asbestos fibres and wires of suitable material.

5. A clutch facing comprising a fabric made up of threads of asbestos fibre having a mineral lubricant composed of ground and sifted mica therein and having wires of a suitable metal wound therein.

6. A clutch facing comprising a fabric made up of threads of asbestos fibre having a compound of ground and sifted mica therein and having wires of brass twisted therein.

7. The process of manufacturing a material suitable for clutch facings which comprises introducing mica into asbestos fibres, rubbing the fibres into threads and weaving fabric from these threads.

8. The process of manufacturing a material suitable for clutch facings which comprises introducing mica into finely shredded fibres rubbing the fibres together into a thread, spinning the thread together with a core of wire of suitable metal twisting two or more of these threads so produced together to form a cord and weaving a fabric from the resulting cords.

9. The process of manufacturing a material suitable for clutch facings which comprises introducing a mineral lubricant composed of ground and sifted mica as a base into finely shredded asbestos fibres, rubbing the fibres together into a thread, spinning the threads so produced with brass wires, twisting two or more of the threads so produced together to make cords and weaving the resulting cords into a fabric.

SAMUEL P. HOWE.